US006968046B2

(12) United States Patent
Mizuno

(10) Patent No.: US 6,968,046 B2
(45) Date of Patent: Nov. 22, 2005

(54) INFORMATION APPARATUS WITH PHONE FUNCTION, RING HISTORY PROCESSING METHOD AND PROGRAM

(75) Inventor: Atsumasa Mizuno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/347,106

(22) Filed: Jan. 17, 2003

(65) Prior Publication Data

US 2003/0186688 A1 Oct. 2, 2003

Related U.S. Application Data

(63) Continuation of application No. PCT/JP02/03214, filed on Mar. 29, 2002.

(51) Int. Cl.[7] .............................................. H04M 11/00
(52) U.S. Cl. ................. 379/93.23; 379/249; 455/414.1
(58) Field of Search .......................... 379/90.01, 92.04, 379/93.03, 93.17–93.18, 93.23, 106.09, 142.04, 379/142.17, 201.1, 207.09, 207.16, 211.01, 379/245–249, 309, 142.07, 211.03; 455/412.2, 455/414.1, 415, 565–567

(56) References Cited

U.S. PATENT DOCUMENTS

| | | | | |
|---|---|---|---|---|
| 5,179,589 A * | 1/1993 | Syu | ........................ | 379/266.07 |
| 6,198,812 B1 * | 3/2001 | Weber | .................... | 379/142.04 |

FOREIGN PATENT DOCUMENTS

| | | | | |
|---|---|---|---|---|
| JP | 6017858 A | 9/1985 | | |
| JP | 60178758 A * | 9/1985 | ........... | H04M 1/00 |
| JP | 01024547 | 1/1989 | | |
| JP | 06188977 A * | 7/1994 | ........... | H04M 3/42 |
| JP | 06311240 A * | 11/1994 | ........... | H04M 3/46 |
| JP | 09027854 A | 1/1997 | | |
| JP | 09116620 A * | 5/1997 | ........... | H04M 1/66 |
| JP | 2000032116 A | 1/2000 | | |
| JP | 2000295324 A * | 10/2000 | ........... | H04M 1/00 |
| JP | 2001326716 A * | 11/2001 | ........... | H04M 1/57 |

OTHER PUBLICATIONS

Search Report.

* cited by examiner

*Primary Examiner*—George Eng
(74) *Attorney, Agent, or Firm*—Staas & Halsey LLP

(57) ABSTRACT

An information apparatus with a phone function is disclosed which comprises a time measurement unit for measuring access time from ring to disconnection, a ring history storage processing unit for storing at every ring a ring history including the access time, and a ring history display processing unit for displaying a ring history with an attention calling indication attached to the access time, when subjected to a ring history display operation, if the access time is equal to or shorter than predetermined time.

8 Claims, 15 Drawing Sheets

| ITEM | NAME OF ITEM | SIZE | TYPE | REMARKS |
|---|---|---|---|---|
| 1 | RING DATE | 10 | ALPHANUMERIC | 2002/1/31 |
| 2 | RING TIME | 5 | ALPHANUMERIC | 23:30 |
| 3 | CALLER PHONE NO. | 20 | ALPHANUMERIC | 09099999999 |
| 4 | CALLED END NAME | 20 | JAPANESE | KAKETARO MEIWAKU |
| 5 | ACCESS TIME | 4 | NUMERAL | 3 |
| 6 | ENDING STATUS | 1 | NUMERAL | 1=RESPONSE,<br>2=ANSWERING PHONE,<br>3=CUTOFF |

INFORMATION APPARATUS WITH PHONE FUNCTION, RING HISTORY PROCESSING METHOD AND PROGRAM

This application is a continuing application, filed under 35 U.S.C. §111(a), of International Application PCT/JP02/03214, filed Mar. 29, 2002.

TECHNICAL FIELD

The present invention relates generally to an information apparatus with a phone function for the storage and display of ring histories of fixed telephone sets, mobile telephone sets, personal computers, PDAs, etc., a ring history processing method and a program, and more particularly to an information apparatus with a phone function for calling attention to wicked calls which use ring histories, a ring history processing method and a program.

BACKGROUND ART

Conventionally, an caller ID service for mobile telephone sets or a number (ID) service for fixed telephone sets is a service for informing of the telephone number of an caller. According to the service, the ring history remains such that a recipient can call back the caller, observing good manners to the caller, even if the recipient was away from home, or could not answer the phone. The ring history function displays information including the ring date and time, the calling partner's telephone No., and the caller name (if the caller telephone No. is listed in the phone book). Also in the ring history, such functions are proposed, including a function for displaying the "unattended ring" and "answer ring" in different colors (Japanese Patent Application Laid-open (Kokai) No. 2001-111675), and a function for leaving only the unattended ring as a history (Japanese Patent Application Laid-open (Kokai) No. 2001-77907). In addition, such a service has been so far provided wherein the ring of the call from a certain specified telephone No. is rejected, and users can receive the service, by applying for entry at the service-window of the telephone company. In the ring rejection service, the system enters a pre-determined specific telephone No., immediately after receiving the call from the telephone No. which the user wants to reject the receipt.

Recently, wicked and nuisance calls are on the rise, which use the display function of the ring history held by information apparatuses with phone functions, such as mobile telephone sets, fixed telephone sets, and moreover, personal computers and PDAs. To be more specific, such acts against public order and good custom are rampant, which collect a large amount of toll, by using a so-called "one call" or "one off" technique, where the call is disconnected immediately after being received, such that the ring history can be left, without being subject to an accounting of toll charge at the exchange, and the recipient is forced to connect to a wicked site, when the recipient calls back. As the technique abusing the ring history automatically performs the processing for disconnecting a call immediately after dialing by means of executing the program, while continuously changing telephone Nos., the abuse of such wicked businesses adversely affect the normal telephone traffic of network facilities.

DISCLOSURE OF THE INVENTION

It is therefore an object of the present invention to provide an information apparatus with a phone function for isolating wicked calls which use ring histories to call attention, a ring history processing method and a program.

The present invention provides an information apparatus with a phone function comprising a time measurement unit for measuring time (hereinafter referred to as "access time") from ring to disconnection; a ring history storage processing unit for storing at every ring a ring history including the time; and a ring history display processing unit for displaying a ring history with an attention calling indication attached to the time, if the time is equal to or shorter than predetermined time. Because of this, even if a wicked call, such as so-called "one call" or "one off" is received, wherein the call is disconnected immediately after being received but leaves a ring history, when the ring history is displayed, for example, an exclamation mark "!" is attached to a short access time, for example, 5 seconds or less, for pointing out the possibility that the ring history can be generated by a wicked call, such that users can be prevented in advance from mistakenly calling back without suspecting it was a wicked call.

Herein, the time measurement unit acquires the ring time and disconnection time, and thereafter figures out access time from ring to disconnection in the form of the difference between the two times. The ring history storage unit stores as the ring history ring day and time, caller telephone No. and caller name, in addition to the time. The information apparatus with a phone function according to the present invention further comprises a nuisance call entry unit for entering into exchange side a nuisance call judged from the time displayed as the ring history, by using a predetermined operation. By this configuration, the information on wicked calls using the ring history can be supplied to the telephone company, so that the telephone company can take necessary measures. The information apparatus with a phone function according to the present invention further comprises a ring history prohibit unit for prohibiting the ring history storage unit from storing the ring history so that the ring history is not left, if the time is equal to or shorter than predetermined time. Thus, so-called "one call" or "one off" wicked calls with short access time no longer leave the ring history, and thus the ring history itself cannot be abused. The information apparatus with a phone function according to the present invention further comprises a ring call control unit for prohibiting a ring call until the time in measurement reaches predetermined time in a nuisance call prevention mode being set, the ring call control unit permitting a ring call operation after the elapse of the predetermined time. Because of this, potential annoyances caused by the so-called "one call" or "one off" wicked calls can be prevented, and thus sleep will no longer be disturbed by short-time rings of such wicked calls.

The present invention provides a ring history processing method for an information apparatus with a phone function. The ring history processing method comprises a time measurement step for measuring time from ring to disconnection; a ring history storage step for storing at every ring a ring history including the time; and a ring history display step for displaying a ring history with an attention calling indication attached to the time, if the time is equal to or shorter than predetermined time.

The present invention provides a program which is executed by a computer of an information apparatus with a phone function. The program allows the computer of the information apparatus with a phone function to execute a time measurement step for measuring time from ring to disconnection; a ring history storage step for storing at every ring a ring history including the time; and a ring history display step for displaying a ring history with an attention calling indication attached to the time, when subjected to a ring history display operation, if the time is equal to or shorter than predetermined time.

BRIEF DESCRIPTION OF DRAWINGS

FIG. 3 is a diagram for describing a ring history format to be stored according to the present invention;

BEST MODE FOR CARRYING OUT THE INVENTION

Figure 1A:
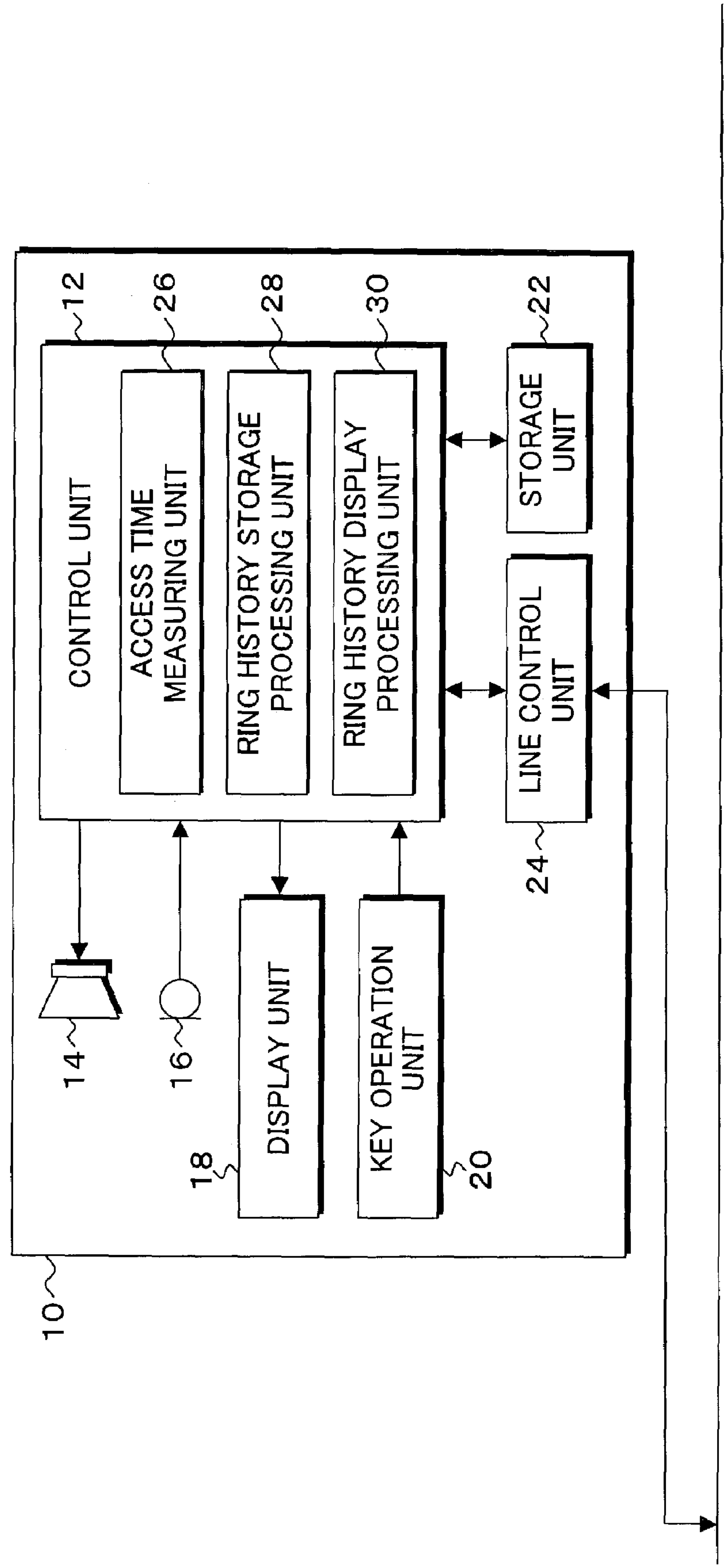
FIGS. 1A and 1B are block diagrams showing an embodiment according to the present invention, together with an exchange for a network and a telephone set of an caller.
Figure 1B:
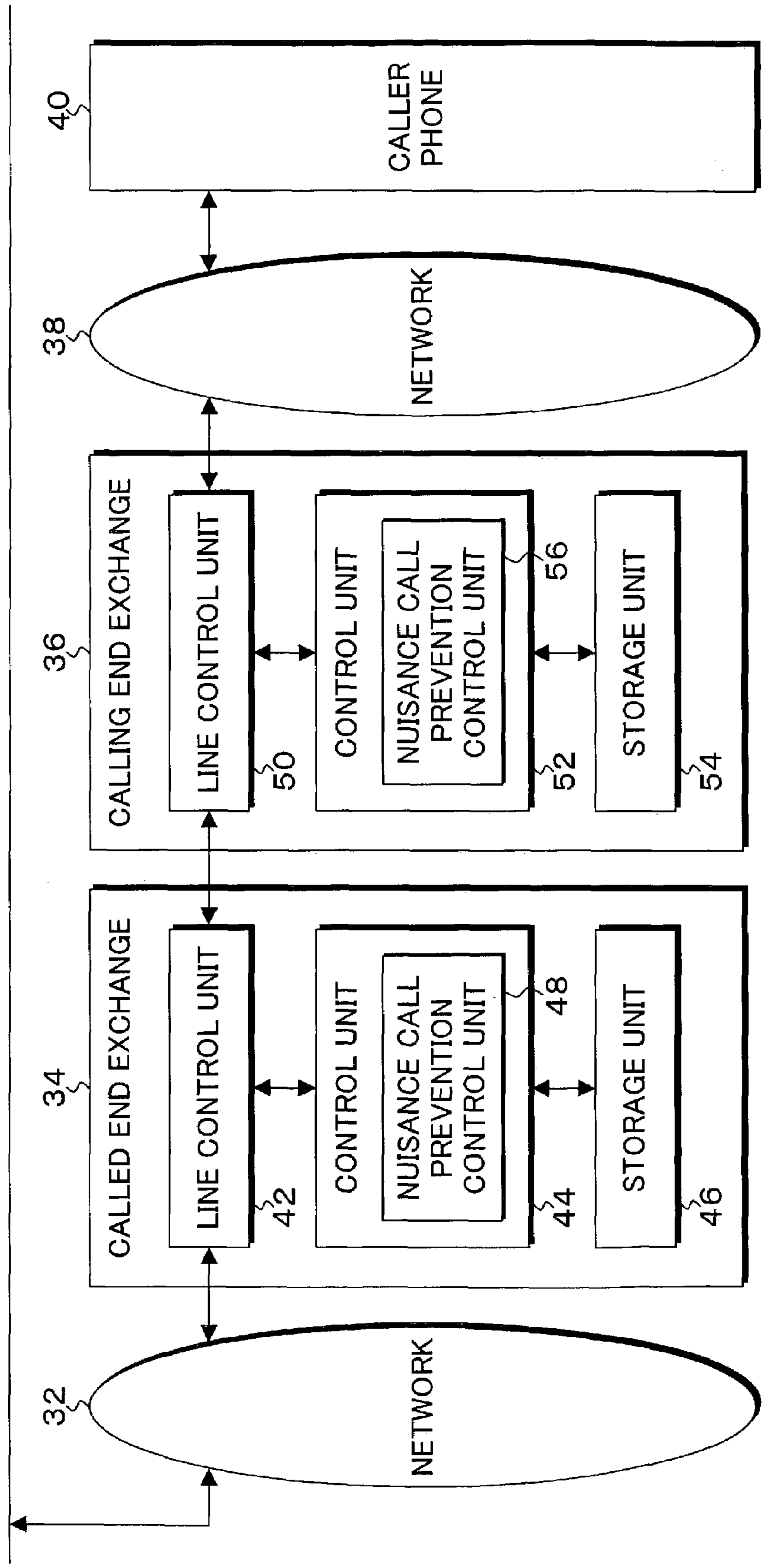

FIGS. 1A and 1B are block diagrams showing a functional configuration for an embodiment of an information apparatus with a phone function according to the present invention, together with an exchange on a network side and a telephone set of an caller. In this embodiment, a mobile telephone set 10 is taken as an example of an information apparatus with a phone function, and the mobile telephone set is connected to an exchange 34 on the ring side through a network 32, by means of a wireless line, and further to a telephone set of an caller 40 by way from an exchange 36 on the caller side to a network 38. The mobile telephone set 10 includes a control unit 12, and to the control unit 12, a storage unit 22 comprising a speaker 14, a microphone 16, a display unit 18, a key operation unit 20 and a memory, and a line control unit 24 are connected.

Figure 2:
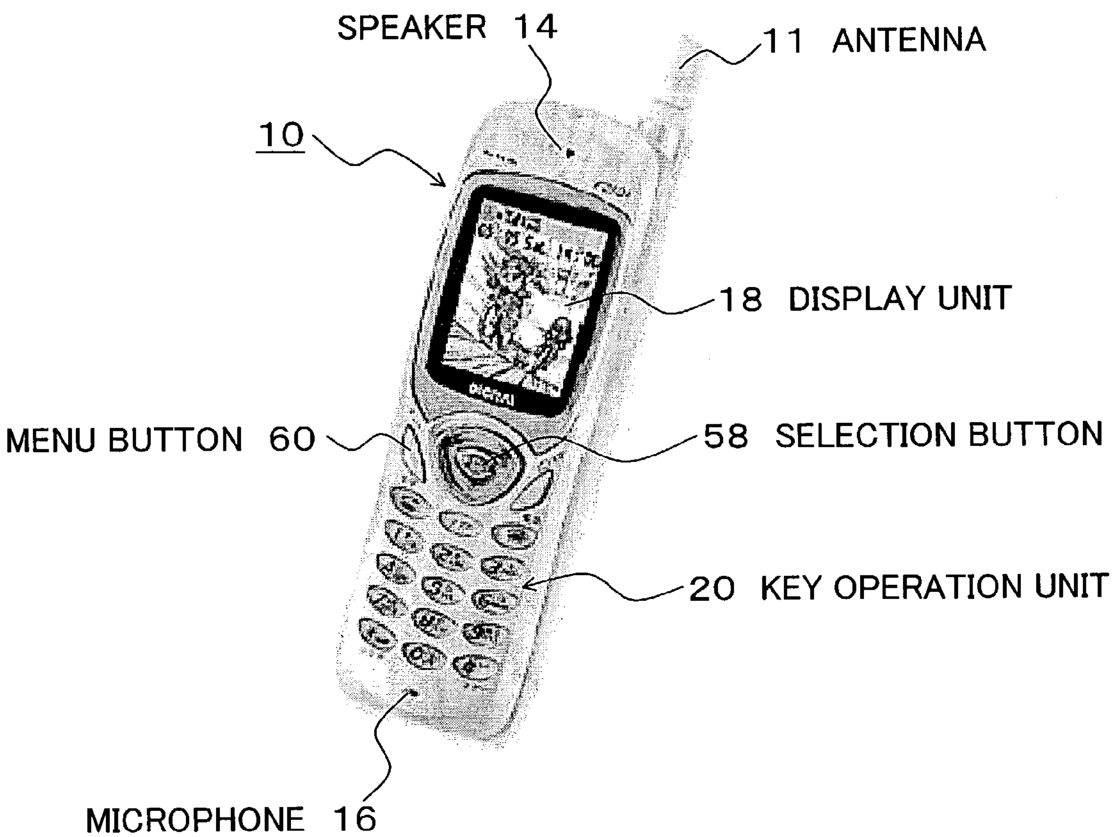
FIG. 2 is a diagram for describing a mobile telephone set applying the present invention.

This mobile telephone set 10 has an external configuration, for example, as shown in FIG. 2. The mobile telephone set 10 has at its upper portion the speaker 14 and then the display unit 18 with a color display function. Under the display unit 18, the key operation unit 20 comprising a selector button 58 and a menu button 60 is provided. Furthermore, on the lowermost portion, the microphone 16 is built into place. Also, an antenna 11 is provided on the upper portion of the mobile telephone set 10.

Referring back to FIGS. 1A and 1B, in order to call attention to so-called "one off" or "one call" wicked calls using a ring history when the ring history of such wicked calls is displayed, an access time measurement unit 26, a ring history storage processing unit 28, and a ring history display processing unit 30 are provided on the control unit 12 of the mobile telephone set 10. The access time measurement unit 26 measures the access time from ring to disconnecting. The ring history storage processing unit 28 stores in the storage unit 22, and keeps every ring call, the ring history including the access time from ring to disconnecting measured by the access time measurement unit 26. In response to the ring history display operation from the key operation unit 20, the ring history display processing unit 30 displays the ring history on the display unit 18, attaching an indication for calling attention to the access time, if the access time is as short as a specified time, for example, 5 seconds or less.

Here, ring history information in accordance with the ring history format 60 shown in FIG. 3 is stored in the storage unit 22. The ring history format 60 has items such as ring date, ring time, caller telephone No., caller name, access time and ending state, and defines the default character size and character type for display for each item, respectively. As shown under the Remarks, the contents of the history, for example, ring date "Jan. 31, 2002", ring time "23:30", caller telephone No. "09099999999", caller name "Kaketaro Meiwaku", and access time "3 seconds" are stored. The ending state, the last item, is expressed by figures, such as "1" means answering, "2" means phone-answering machine, and "3" means disconnected. The caller name is available, only when the name is pre-listed in the telephone directory of the mobile telephone set 10, however, since the caller name of a nuisance call is unknown, this item is not displayed, or a tentative name representing the caller of a wicked call, for example "Kaketaro Meiwaku" is used.

Figure 4:
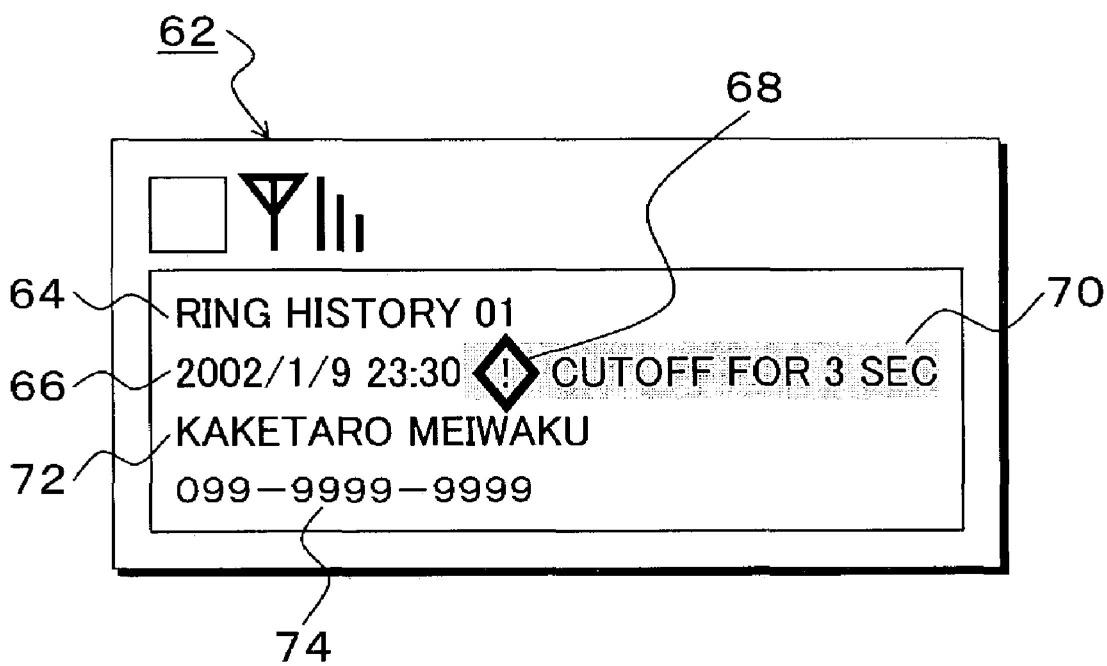
FIG. 4 is a diagram for describing a ring history-displaying screen according to the present invention.

FIG. 4 is a diagram for describing a ring history display screen 62 to be displayed on a display unit 18 by the ring history display processing unit 30 shown in FIGS. 1A and 1B, when a wicked call is received. On the ring history display screen 62, a ring year-month-day 66 is displayed following a ring history No. 64, and then "3 seconds disconnected" is displayed as an access time 70, after an attention calling mark 68, for example, a "!" mark is displayed for indicating the possibility of a wicked call. Further, if pre-listed in the telephone directory, an caller name 72 is displayed, and under the name, an caller telephone No. 74 is registered. On this ring history display screen 62, the items are the same as those of the conventional ring history display, except the attention calling mark 68 and the access time 70.

Referring again to FIGS. 1A and 1B, a line control unit 42, a control unit 44, and a storage unit 46 are provided on the exchange 34 on the ring side to be connected through the network 32. According to the present invention, a nuisance call prevention control unit 48 is provided on the control unit 44 for the exchange 34 on the ring side, in accordance with the wicked call entry processing from the mobile telephone set 10, which received a wicked call. Also, an exchange 36 on the caller side comprises a line control unit 50, a control unit 52 and a storage unit 54. Also, a nuisance call prevention control unit 56 is provided as the caller side on the exchange 36 on the caller side, corresponding to the function of the nuisance call prevention control unit 48 in the exchange 34 on the ring side.

Figure 5:
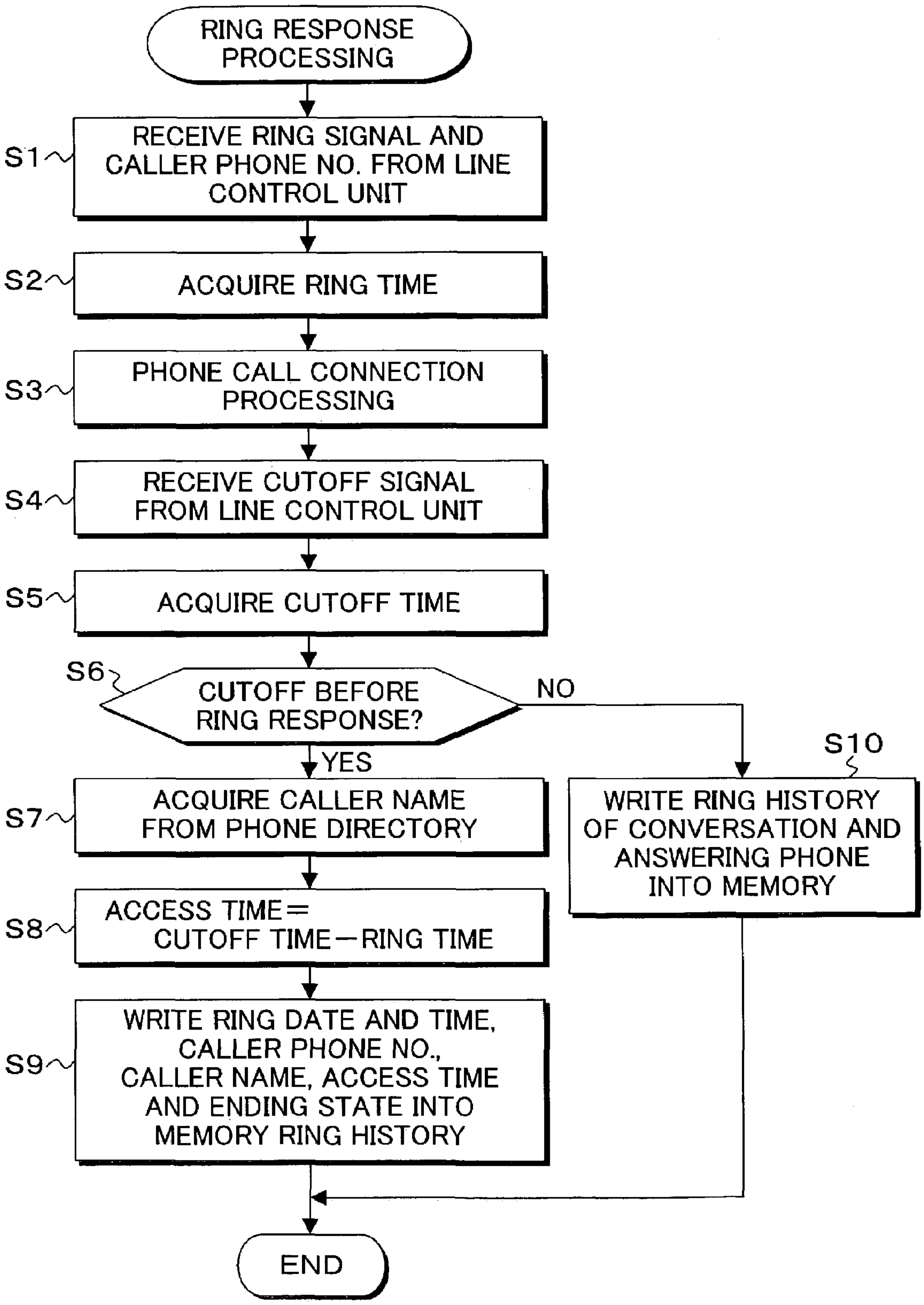
FIG. 5 is a flowchart for a ring-call response processing according to the embodiment shown in FIGS. 1A and 1B.

FIG. 5 is a flowchart for a ring call response processing including ring of wicked calls in the mobile telephone set 10 shown in FIGS. 1A and 1B. When a ring signal and an caller telephone No. are received from the line control unit 42 in the exchange 34 on the ring side at step S1, a ring operation by the control unit 12 is activated, and the ring time is obtained as the current time at step S2. Then at step S3, a speech communication connection processing is performed in accordance with the normal ring sequence. The speech communication connection processing comprises three processes; a process for connecting speech communication by the normal ring phone answering, a process for connecting a phone-answering machine according to the entry of a phone-answering machine, and further a process for disconnecting ring call before ring call answering. Next at step S4, when a disconnect signal is received from the line control unit 42 in the exchange 34 on the ring side, disconnection time is obtained at step S5 as the current time. Then at step S6, confirmation is made if disconnection was made before ring call answering or not. If disconnection is made in a short time from ring due to a wicked phone, the disconnection before ring phone answering is discriminated. Then, the program goes to step S7, and the caller name is obtained, if registered, by the search of the telephone directory with the obtained caller telephone No. Next, at step S8, the access time from ring to disconnecting is calculated, by means of subtracting the ring time obtained at step S2 from the disconnection time obtained at step S5. Finally at step S9, the ring day and time, caller telephone No., caller name, access time, and ending state are written into memory according to the ring history format shown in FIG. 3. On the other hand, if disconnection was not made before ring call answering at step S6, and instead, connection was made to a speech communication connection or a phone-answering machine service, the program goes to step S10, and conversation or the ring history of the phone-answering machine is written into memory. As to the conversation or the ring history of the phone-answering machine, either one of the following two methods is tolerable; the conventional method of writing the ring history excluding the access time into memory, or the method of writing the ring history according to the ring history format shown in FIG. 3, where the access time from ring to disconnecting is included, like the cases of steps S7 to S9, where disconnection was made before ring call answering.

Figure 6:
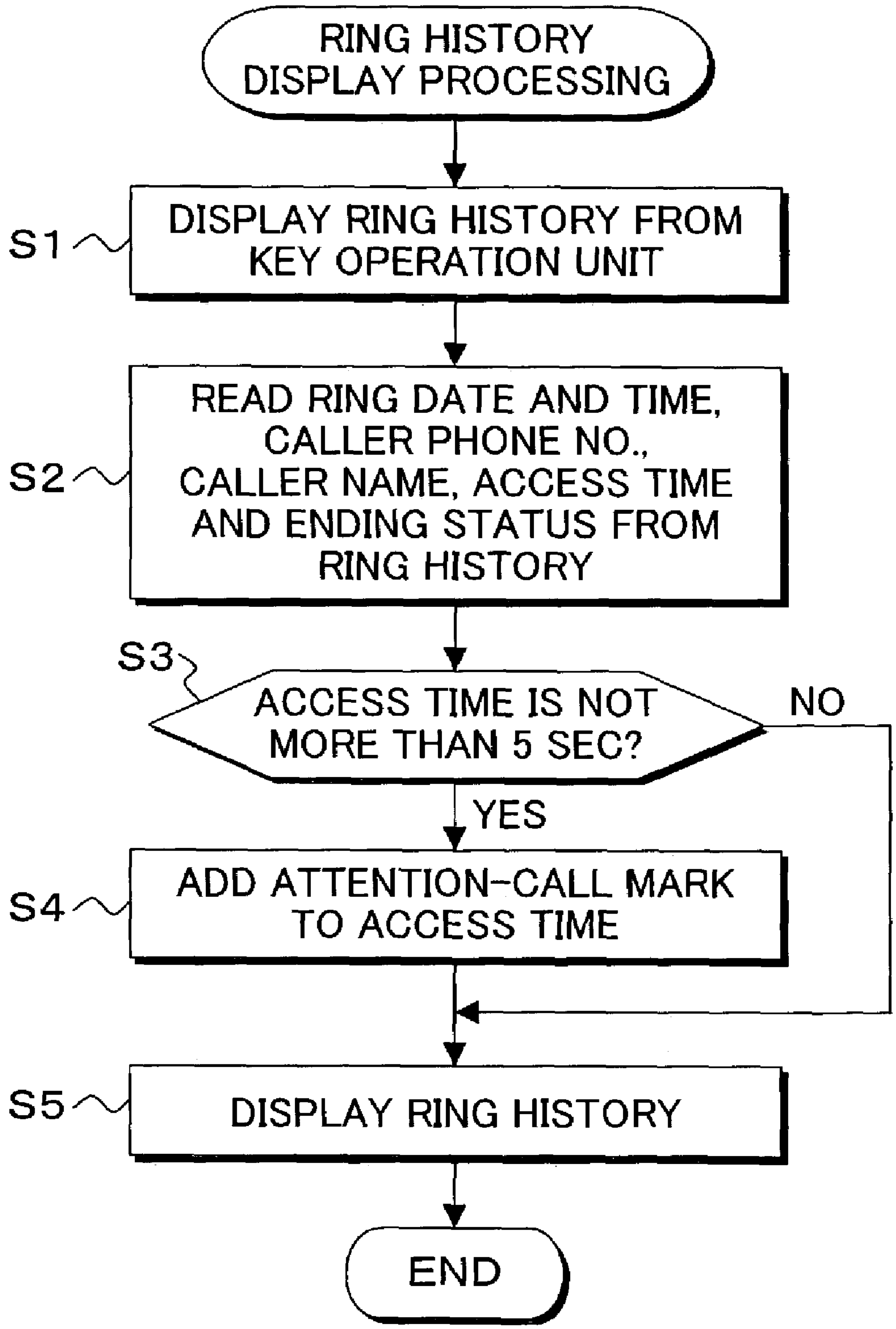
FIG. 6 is a flowchart for a ring history display processing according to the embodiment shown in FIGS. 1A and 1B.

FIG. 6 is a flowchart for a ring history display processing in the mobile telephone set 10 shown in FIGS. 1A and 1B. At step S1, when the operation entry of the ring history display from the key operation unit 20 is accepted, at step S2, the ring day and time, caller telephone No., caller name, access time and ending state selectively operated from the ring history stored in the storage unit 22 are read into work memory, and then at step S3, confirmation is made if the access time is, for example, 5 seconds or less. If the access time is 5 seconds or less, the ring call is judged as a so-called "one call" or "one off" wicked call, and at step S4, an attention ring mark 68 is attached as shown on the ring history display screen 62 in FIG. 4, and the ring history is displayed at step S5.

Figure 7:
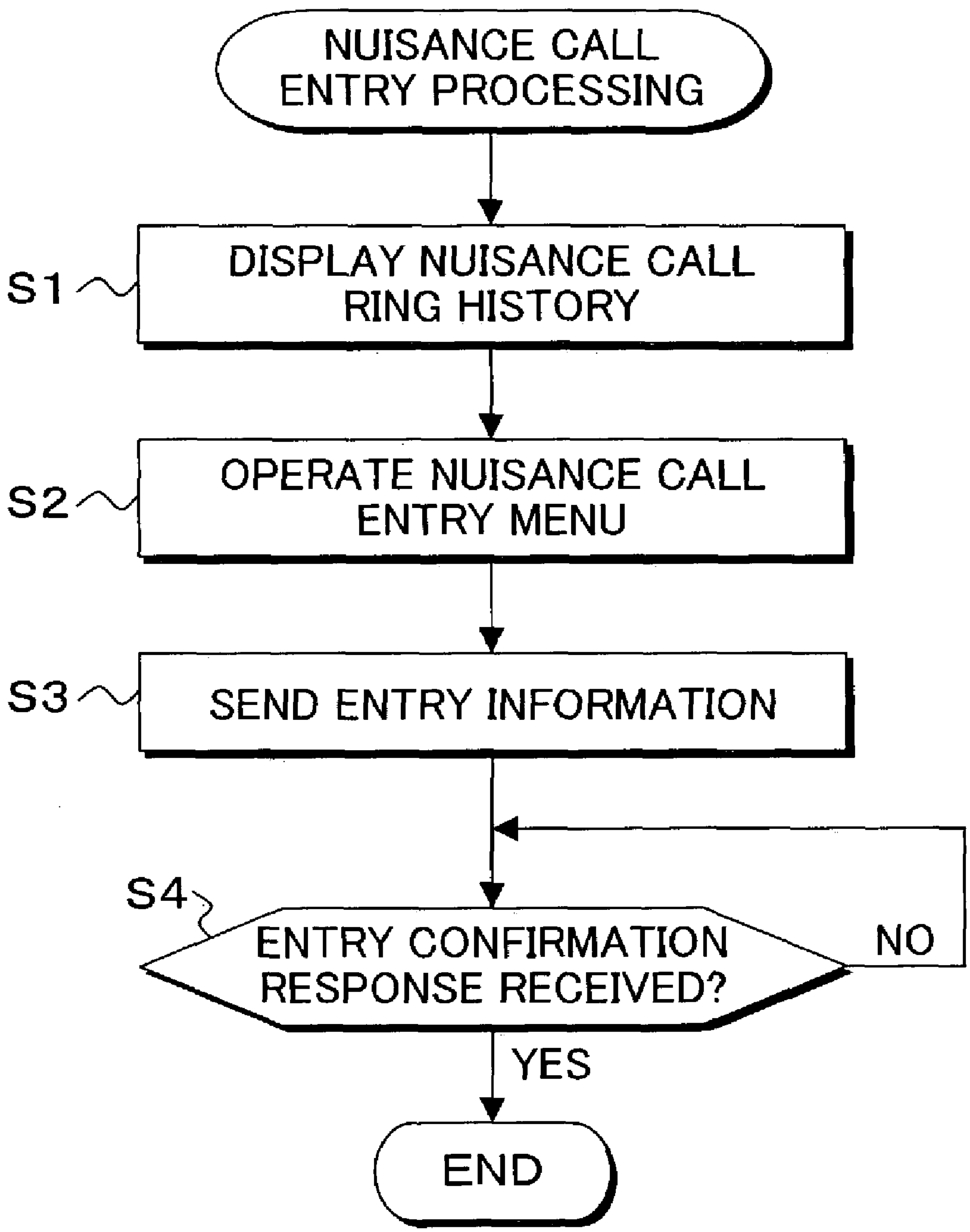
FIG. 7 is a flowchart for a nuisance call entry processing according to the embodiment shown in FIGS. 1A and 1B.

FIG. 7 is a flowchart for a nuisance call entry processing for the exchange 34 on the ring side in the mobile telephone set 10 shown in FIGS. 1A and 1B. In this nuisance call entry processing, the ring history of a nuisance call to be registered is displayed at step S1, and a nuisance call entry menu screen is selectively operated at step S2. In addition, at step S3, processing for sending the entry information is performed by the use of the selective screen. Finally at step S4, when entry confirmed answer from the exchange 34 on the ring side is received, processing ends.

Figure 8A:
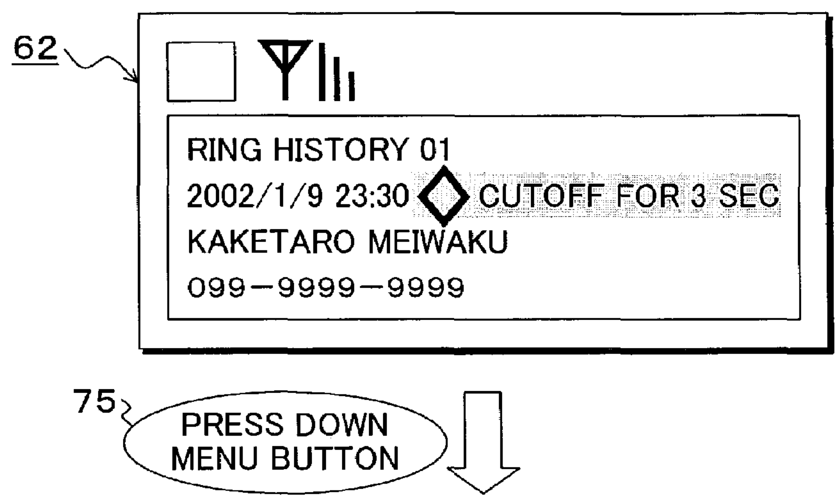
FIGS. 8A–8D are diagrams for describing screen transitions associated with the operation of the nuisance call entry processing shown in FIG. 7.
Figure 8B:
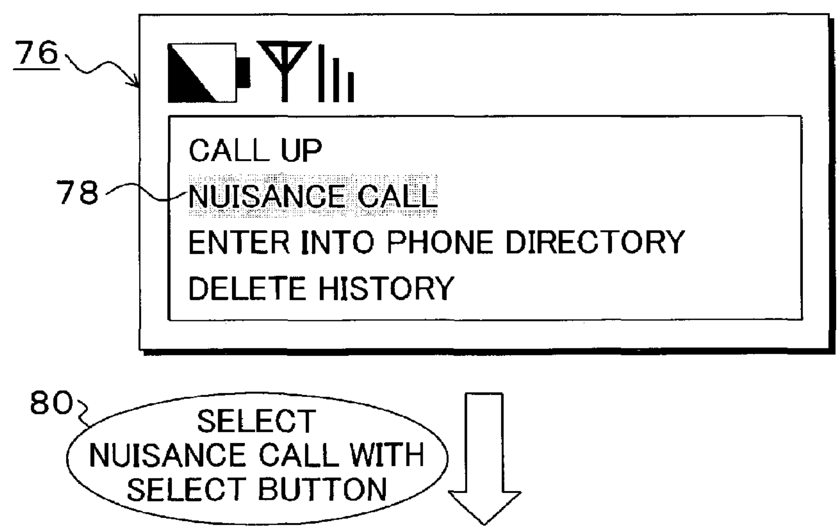
Figure 8C:
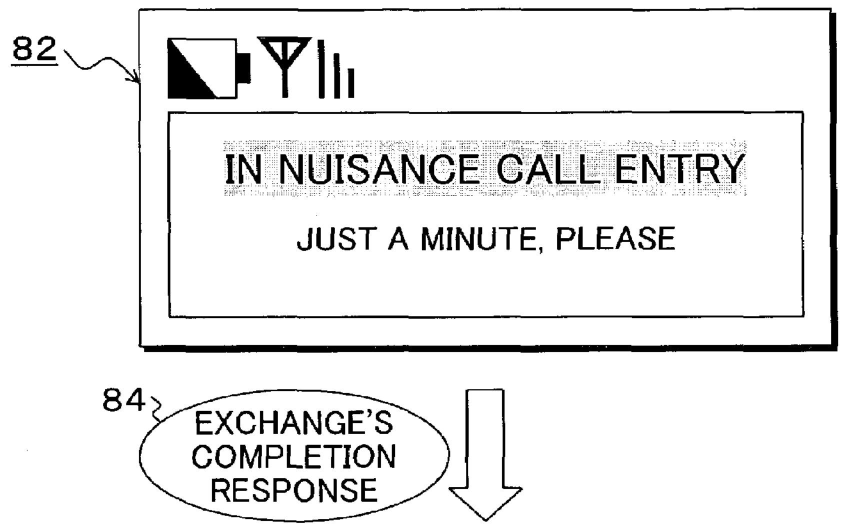
Figure 8D:
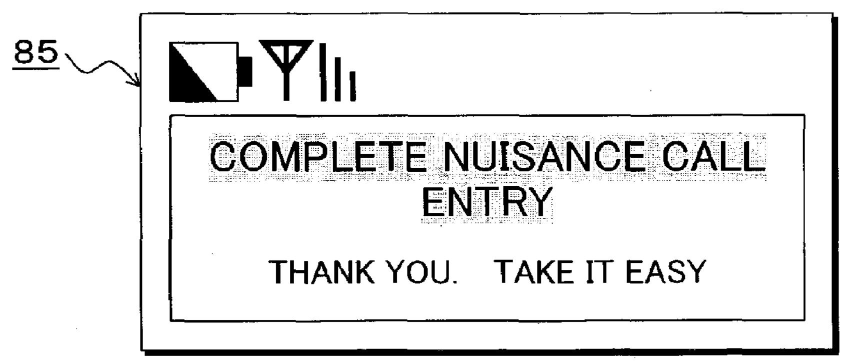

FIGS. 8A–8D show transition of the operation screen in the nuisance call entry processing for the exchange 34 on the ring side shown in FIG. 7. First of all, as shown in FIG. 8A, the ring history screen 62 for the wicked call is selected and displayed for performing the entry processing of the nuisance call. Next, the screen is changed to a menu screen 76 shown in FIG. 8B, when a menu button is pushed down 75. As this menu screen 76 includes a nuisance call entry menu 78, this menu is selected for selecting a nuisance call 80 with a selector button. Due to this nuisance call 80, the screen is changed to a screen 82 showing the state under entry as shown in FIG. 8C. When a finish answer 84 of the exchange is accepted, the screen is changed to a nuisance call entry finish screen 85 shown in FIG. 8D, thus a series of nuisance call entry processing ends. As described above, in the mobile telephone set 10 according to the present invention, nuisance calls can be easily registered to the exchange 34 on the ring side, with the use of the ring history of a nuisance call.

Figure 9:
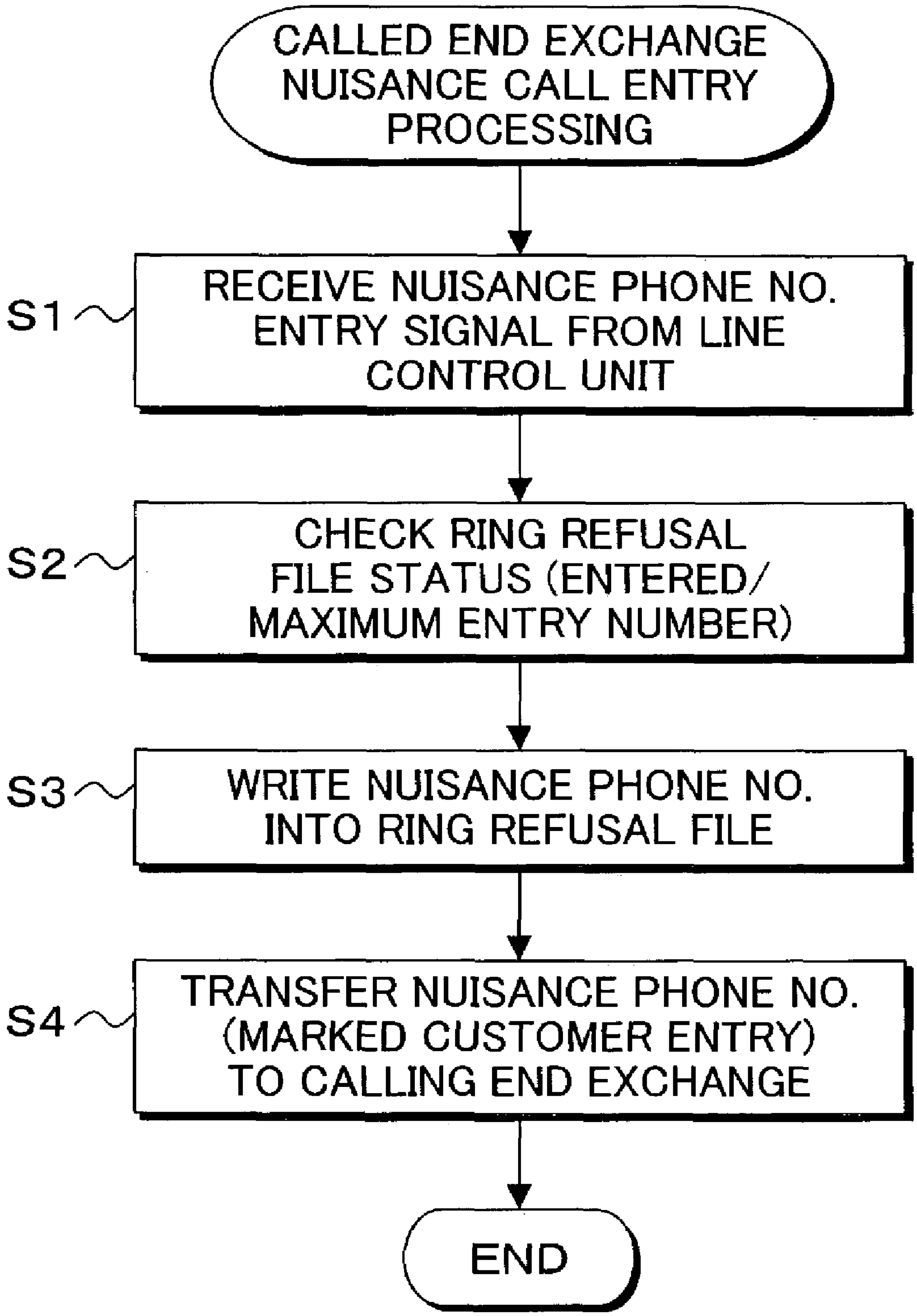
FIG. 9 is a flowchart for a nuisance call entry processing by an exchange on a ring side, in response to the nuisance call entry operation shown in FIG. 7.

FIG. 9 is a flowchart for a entry processing by a nuisance call prevention control unit 48 provided on the exchange 34 on the ring side, associated with a nuisance call entry processing from the mobile telephone set 10 shown in FIGS. 7, 8A–8D. In the nuisance call entry processing of the exchange on the ring side, when a entry signal of an unsolicited telephone No. from the line control unit 42 is received at step S1, at step S2, the state of a ring rejection file which is pre-held is checked, to be more specific, non-registered number and the maximum number of entries are checked. Then, the program goes to step S3, and the received unsolicited telephone No. is written into the ring rejection file. Finally at step S4, the nuisance call that is the risky customer entry is transferred to the exchange 36 on the ring side.

Figure 10:
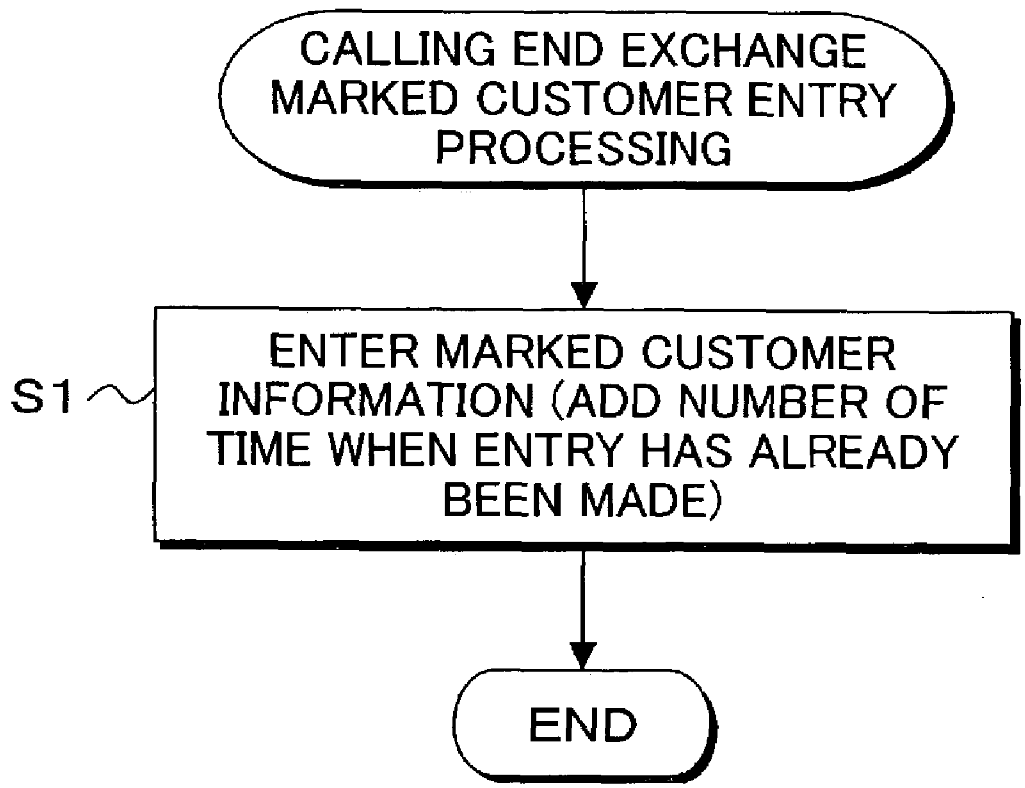
FIG. 10 is a flowchart for a risky customer entry processing by an exchange on an caller side associated with the nuisance call entry processing by the exchange on the ring side shown in FIG. 9.

FIG. 10 is a flowchart for a risky customer entry processing in the exchange 36 on the caller side, in response to an entered telephone No. transfer processing from the exchange 34 on the ring side shown in FIG. 9. In the risky customer entry processing, the risky customer information received at step S1 is registered in a risky customer information file. If the information is already registered in the file, the number of times is added.

Figure 11:
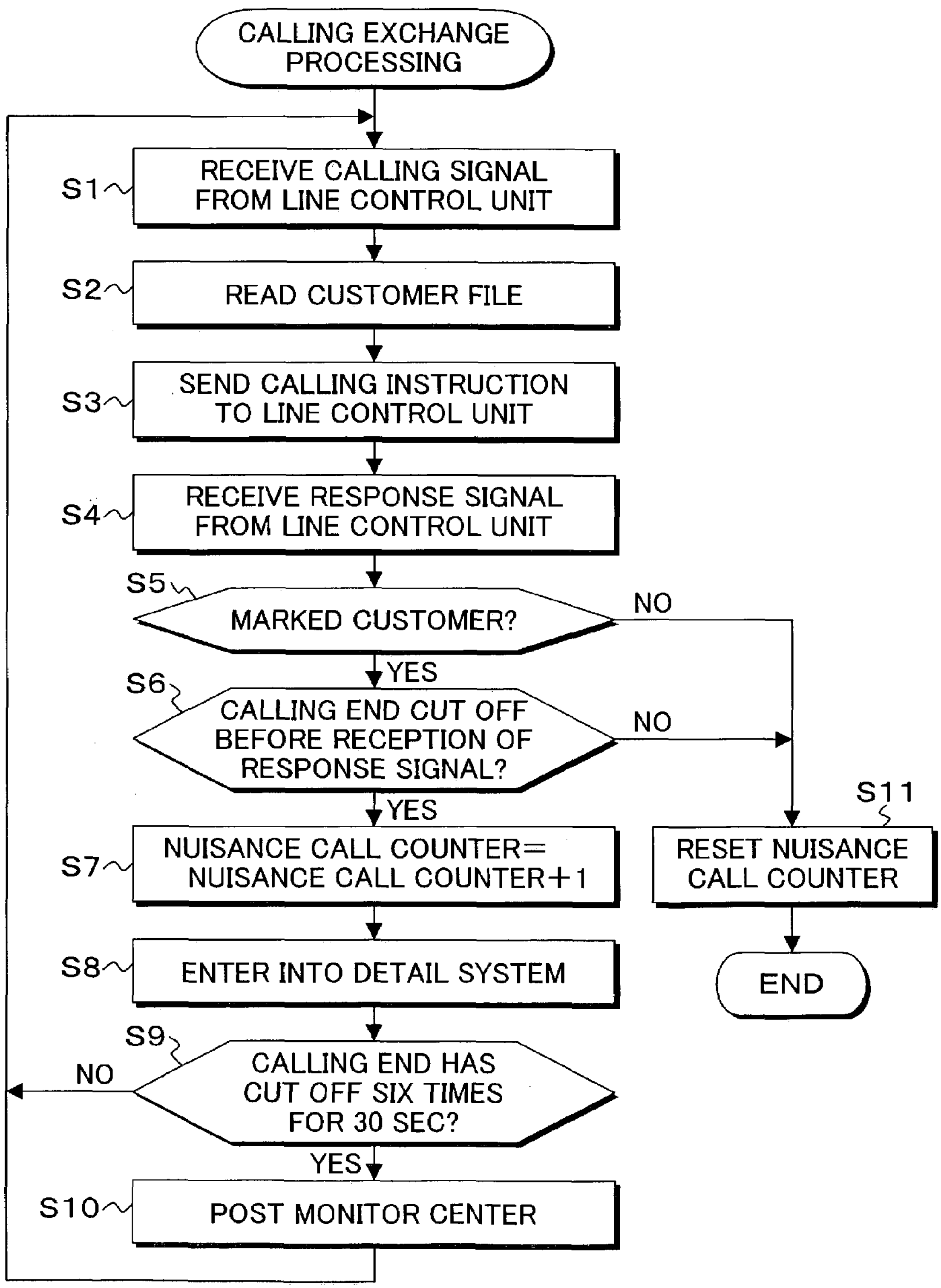
FIG. 11 is a flowchart for an origination exchange processing to risky customers in the exchange on the caller side.

FIG. 11 is a flowchart for an origination exchange processing by a nuisance call prevention control unit 56 in the exchange 36 on the caller side by the use of the risky customer file generated in FIG. 10. When the exchange 36 on the caller side receives an issue signal from a line control unit 50 at step S1, the program goes to step S2, and the pre-held customer file (line file) is read in. Then at step S3, issue to the line control unit 50 is instructed, and an answer signal is received from the line control unit 50 at step S4. At step S5, checking is made whether the customer is risky or not from the customer file read in at step S2. If the customer is risky, the program goes to step S6, and whether the caller side disconnects the call before receiving an answer signal from the ring side. If the caller side disconnected the call before receiving an answer signal, the call is judged as a nuisance call, and a nuisance call counter is counted up by 1 at step S7. The nuisance call counter in the initial state is set to zero. Next at step S8, an origination processing of risky customers is registered in a detail system. Then at step 9, checking is made if the number of times when the caller side of the same risky customer disconnected the ring 30 seconds reached 6 times or not. If the number of times is under 6 times, the program goes to step S1, and the same processing is repeated. At step S9, if the number of times when the caller side disconnected the call from the same risky customer in 30 seconds reached 6 times, in short, if the value of the nuisance call counter reached 6 times, the program goes to step S10, and informs to a monitor center, that the origination operation of a so-called "one call" or "one off" wicked call is being performed. On the other hand, if the customer read from the line file at step S5 was not a risky customer, or if the caller side disconnected the call after receiving an answer signal at step S6, the program goes to step S11, and resets the nuisance call counter and ends the processing.

Such processing adapted to deal with wicked calls in the exchange 34 on the ring side and the exchange 36 on the caller side associated with the entry based on the ring history of wicked calls from the mobile telephone set 10 according to the present invention as shown in FIGS. 9, 10 and 11 does not include the contents adapted to directly deal with calling attention to the ring history of wicked calls in the mobile telephone set 10 according to the present invention, however, by additional provision given to the exchange side, in addition to the function calling attention to wicked calls by the use of the ring history in the mobile telephone set 10 according to the present invention, so-called "one off" or "one call" wicked calls can be more properly prevented.

Figure 12:
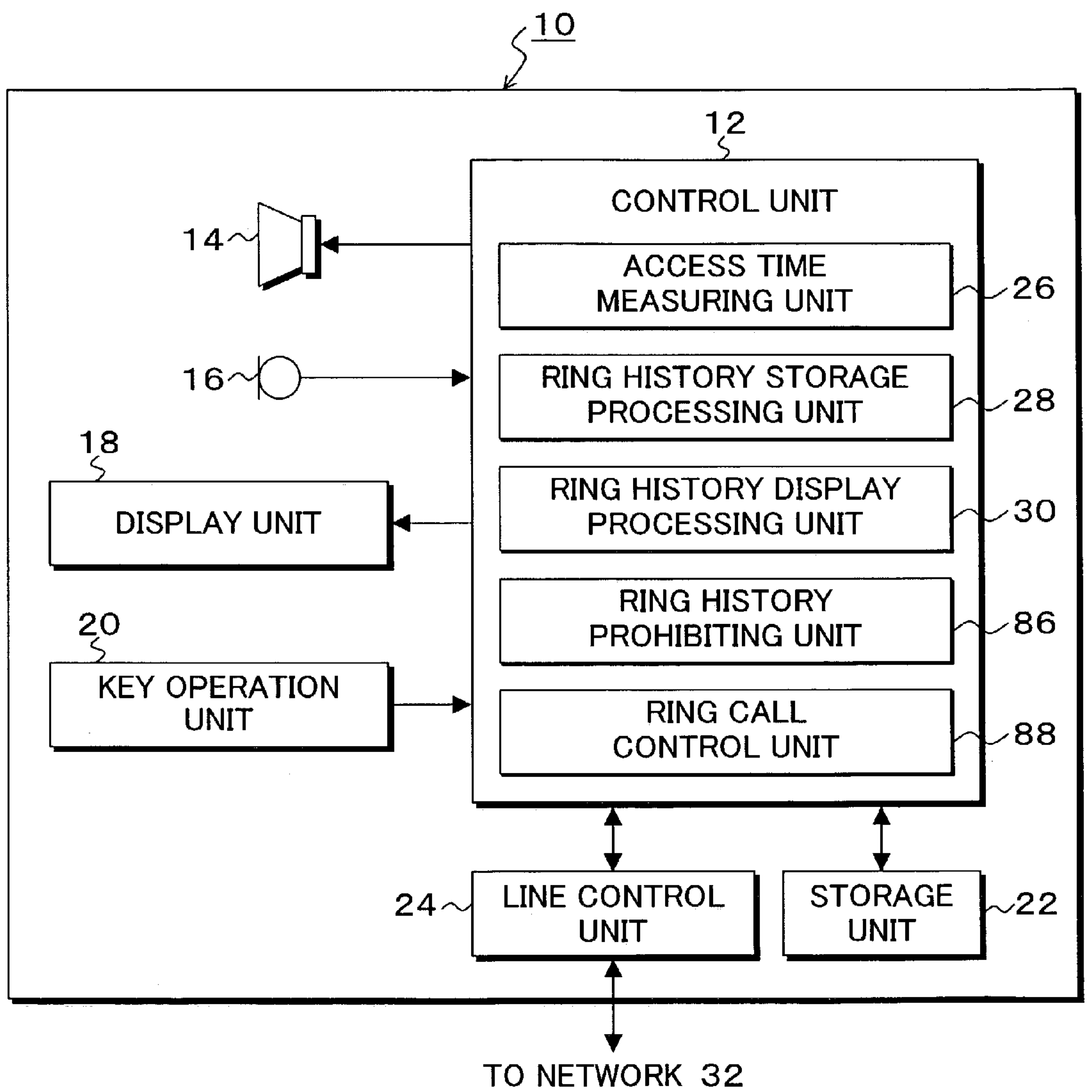
FIG. 12 is a block diagram showing another embodiment according to the present invention, provided with a function for prohibiting a ring history and a ring call.

FIG. 12 is a block diagram of another embodiment of the present invention, wherein a function is provided against wicked calls using ring history, for prohibiting ring history and ring call. This embodiment of the mobile telephone set 10 newly adds a ring history prohibit unit 86 and a ring call control unit 88, in addition to the structure of the control unit 12 in the embodiment shown in FIGS. 1A and 1B. The other structural functions are the same as those of the embodiment shown in FIGS. 1A and 1B. The ring history prohibit unit 86 prohibits the ring history storage processing unit 28 from recording a ring history, so that the record is not left as the ring history, if the access time measured by the access time measurement 26 is a specified time, for example, 5 seconds or less, justifiable duration for defining a wicked call. Due to this system, even if a so-called "one off" or "one call", which is disconnected immediately after ring, is received, the technique of wicked calls intending to use a ring history cannot be used, because a ring history itself is not left. The ring call control unit 88 prohibits the ring call until the time elapsed from the ring time reached a specified time, for example, 5 seconds, a justifiable duration for defining wicked calls, in a specified mode, for example, a nuisance call prevention mode being set, and 5 seconds after allows the operation of ring call to be activated. Due to this system, even if a wicked call using a technique for disconnecting immediately after ring is received, the ring call is prohibited, so that potential annoyances such as sleep disturbance by ring call of so-called "one off" or "one call" can be prevented in advance.

Figure 13:
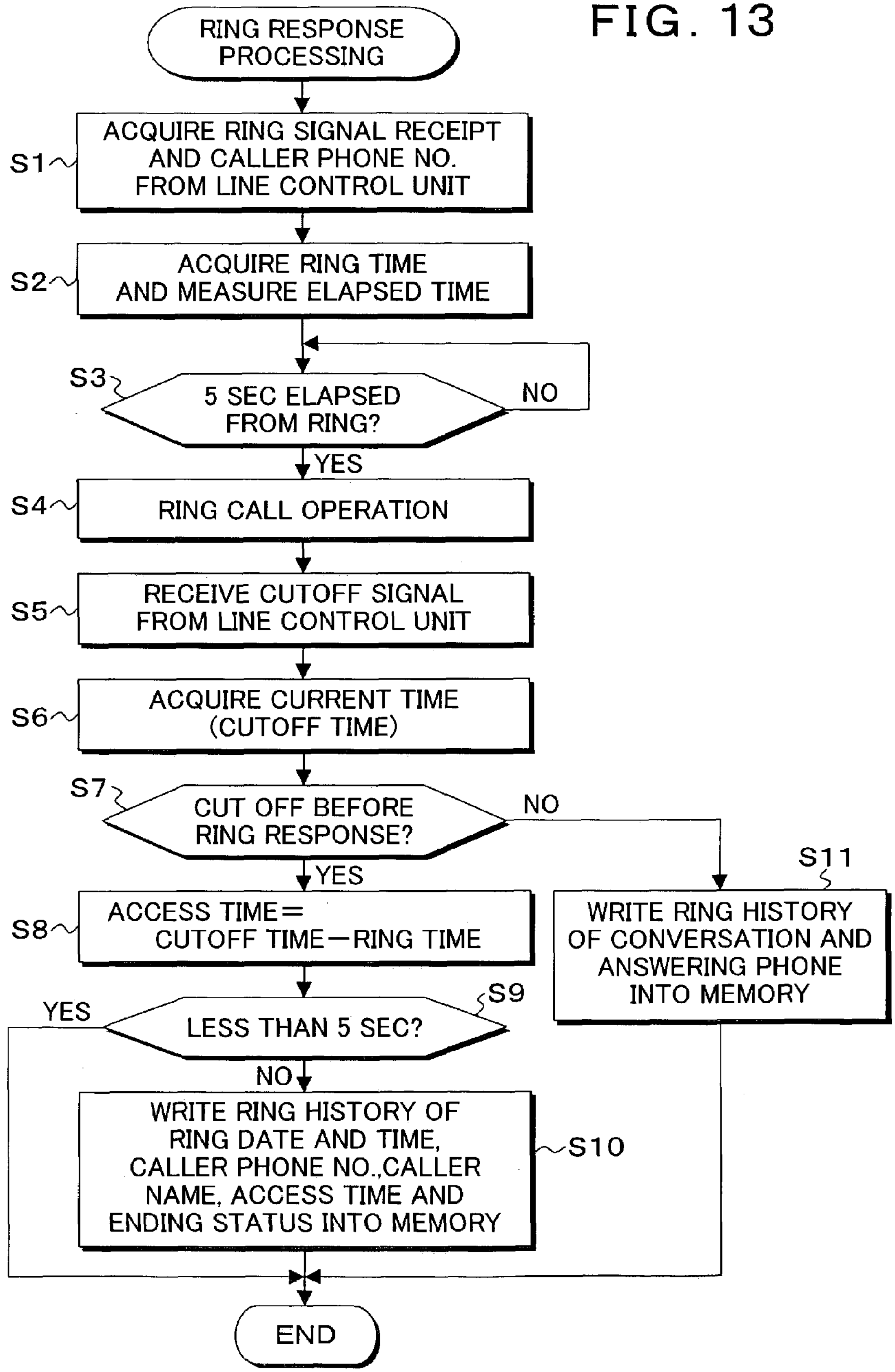
FIG. 13 is a flowchart for a ring response processing in the embodiment shown in FIG. 12.

FIG. 13 is a flowchart for a ring call response processing in the embodiment shown in FIG. 12. In this processing, after a ring signal receipt and an caller telephone No. are obtained from the line control unit in the exchange on the ring side at step S1, the ring time is obtained at step S2, and then the measurement of the elapsed time starts. At this time, if the nuisance call prevention mode is set, the output of the ring call is in the mute state, so that a ring call or ring melody is not delivered. When 5 seconds elapsed from ring at step S3, the ring call operation becomes effective at step S4, and a ring call or ring melody is outputted. Next at step S5, when a disconnection signal is received from the line control unit in the exchange on the ring side, the disconnection time is obtained as the current time at step S6. Then, at step S7, checking is made if disconnection was made before ring call answer, or not, and if disconnection was made before ring call answer, the access time is calculated at step S8. Next, at step S9, if the access time is a specified time, for example, 5 seconds or less, justifiable duration for defining wicked calls, the process at step S10 for writing the ring history into memory is skipped, so that no ring history is left. If the access time exceeded 5 seconds, at step S10, the ring history is written into memory according to the ring history format shown in FIG. 3. As a matter of course, if disconnection is not made before ring call answer at step S7, the conversation or the ring history of the phone-answering machine is written in memory at step S12.

In the embodiment shown in FIG. 12, both of the functions of the ring history prohibit unit 86 and the ring call control unit 88 are provided on the control unit 12, however, either one of the two can be provided as other embodiments. The above-mentioned embodiment takes a mobile telephone set as an information apparatus with a phone function, however, other than that, the present invention can be applied, without modification, to information apparatuses with phone functions such as fixed telephone sets, personal computers, PDAs or television sets. The present invention covers reasonable variations, which do not impair its object and merit, and is not subject to restrictions by values given in the above-mentioned embodiment.

INDUSTRIAL APPLICABILITY

As set forth hereinabove, according to the present invention, the user can securely recognize a wicked call, when the ring history is displayed, because an attention calling mark is attached to the displayed history for pointing out the possibility that the ring history is of a wicked call, even if the user received a so-called "one call" or "one off" wicked call which is disconnected immediately after ring, and leaves the ring history, so that the user can be protected from damages in advance, such as the user can be prevented from ringg back without noticing that the ring history is of the wicked call, and being forced to connect to a wicked site, thereby resulting in paying a large amount of tolls. Also, the user can make the technique of wicked calls using the ring history unavailable, by not allowing the ring history itself to remain, if the user judged the ring call as a wicked call abusing the ring history. Furthermore, sleep disturbance caused by short time ring tone or ring melody produced from a wicked call using the ring history can be prevented, by means of setting a particular mode, such as a nuisance call prohibit mode for prohibiting ring call until the access time elapsed from ring reaches a specified time, justifiable duration for defining wicked calls.

What is claimed is:

1. An information apparatus with a phone function comprising:

a time measurement unit to measure time of incoming calls from ring to disconnection;

a ring history storage processing unit to store at each of the incoming calls a ring history including said measured time;

a ring history display unit to display said ring history in response to a key operation; and a time determination unit to determine whether said measured time included in said ring history is equal to or shorter than a predetermined time;

wherein the ring history display unit displays an attention-calling indication along with a ring in the ring history only in response to the ring being equal to or shorter than said predetermined time.

2. The information apparatus according to claim 1, wherein said time measurement unit acquires the ring time and disconnection time, and thereafter determines access time from ring to disconnection in the form of the difference between the two times.

3. The information apparatus according to claim 1, wherein said ring history storage unit stores as said ring history ring day and time, a caller telephone number, and caller name, in addition to said measured time.

4. The information apparatus according to claim 1, further comprising a nuisance call entry unit for entering into exchange side a nuisance call determined from said measured time displayed as said ring history, by using a predetermined operation.

5. The information apparatus according to claim 1, further comprising:
  - a ring history prohibit unit for prohibiting the ring history storage unit from storing said ring history in response to said measured time being equal to or shorter than said predetermined time.

6. The information apparatus according to claim 1, further comprising a ring call control unit to prohibit a ring call until said measured time in measurement reaches the predetermined time in a nuisance call prevention mode being set, said ring call control unit permitting a ring call operation after the elapse of said predetermined time.

7. A ring history processing method for an information apparatus with a phone function, the method comprising:
  - measuring time of incoming calls from ring to disconnection;
  - storing at each of the incoming calls a ring history including said measured time;
  - displaying said ring history in response to a key operation;
  - determining whether said measured time included in said ring history is equal to or shorter than a predetermined time; and
  - displaying an attention-calling indication with said ring history only in response to said measured time being equal to or shorter than said predetermined time.

8. A computer readable medium including a program executable by a computer of an information apparatus with a phone function to perform:
  - measuring time of incoming calls from ring to disconnection;
  - storing at each of the incoming calls a ring history including said measured time;
  - displaying said ring history in response to a key operation;
  - determining whether said measured time included in said ring history is equal to or shorter than a predetermined time; and
  - displaying an attention-calling indication with said ring history only in response to said measured time being equal to or shorter than said predetermined time.

* * * * *

UNITED STATES PATENT AND TRADEMARK OFFICE

CERTIFICATE OF CORRECTION

PATENT NO. : 6,968,046 B2
APPLICATION NO. : 10/347106
DATED : November 22, 2005
INVENTOR(S) : Atsumasa Mizuno It is certified that error appears in the above-identified patent and that said Letters Patent is hereby corrected as shown below:

Column 9, Line 7 (claim 2, line 2), after “storage” insert - - processing - -.
Column 9, Line 8 (claim 3, line 3), after “history” insert - - a - -.
Column 9, Line 9 (claim 3, line 3), insert - - a - - before “caller”.
Column 9, Line 9 (claim 3, line 3), after “name” delete “,”.
Column 9, Line 11 (claim 4, line 2), delete “for entering” and insert - - to enter - - therefor.
Column 9, Line 12 (claim 4, line 3), insert - - an - - before “exchange”.
Column 9, Line 17 (claim 5, line 3), delete “for prohibiting the” and insert - - to selectively prohibit said - - therefor.
Column 9, Line 18 (claim 5, line 4), after “storage” delete - - processing - -.

Signed and Sealed this

Fifteenth Day of August, 2006

JON W. DUDAS
*Director of the United States Patent and Trademark Office*